United States Patent
Higuchi et al.

(10) Patent No.: US 9,098,073 B2
(45) Date of Patent: Aug. 4, 2015

(54) BIOMETRIC AUTHENTICATION APPARATUS AND BIOMETRIC AUTHENTICATION METHOD

(75) Inventors: Teruyuki Higuchi, Tokyo (JP); Toshio Kamei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 13/824,166

(22) PCT Filed: Sep. 20, 2011

(86) PCT No.: PCT/JP2011/071362
§ 371 (c)(1),
(2), (4) Date: Mar. 15, 2013

(87) PCT Pub. No.: WO2012/043299
PCT Pub. Date: Apr. 5, 2012

(65) Prior Publication Data
US 2013/0176109 A1    Jul. 11, 2013

(30) Foreign Application Priority Data
Sep. 28, 2010  (JP) ................................. 2010-216378

(51) Int. Cl.
*G05B 19/00* (2006.01)
*G05B 1/01* (2006.01)
*G06K 9/00* (2006.01)

(52) U.S. Cl.
CPC .............. *G05B 1/01* (2013.01); *G06K 9/00912* (2013.01); *G06K 2009/0006* (2013.01); *G06K 2009/00932* (2013.01)

(58) Field of Classification Search
CPC ..... G06F 21/32; G06F 21/35; G06F 19/3462; G07C 9/00158; G07C 9/00087; G07C 9/00563; G07C 2009/00095; G07C 9/00134; G06K 9/00087; G06K 9/0002; G06K 9/00; G06K 9/00885; G06K 2009/00932; G06K 9/00013; G06K 9/00288; G06K 9/00892
USPC ............................ 340/5.52, 5.53, 5.82, 5.83; 382/115–127
See application file for complete search history.

(56) References Cited

U.S. PATENT DOCUMENTS 5,852,670 A *  12/1998  Setlak et al. .................. 382/126
2009/0110249 A1*  4/2009  Miura et al. ................. 382/124

FOREIGN PATENT DOCUMENTS

| JP | 2005128935 A | 5/2005 |
| JP | 2005323892 A | 11/2005 |
| JP | 2007102587 A | 4/2007 |
| JP | 2008004001 A | 1/2008 |
| JP | 2008015939 A | 1/2008 |

OTHER PUBLICATIONS

The international search report for PCT/JP2011/071362 mailed on Nov. 8, 2011.

* cited by examiner

*Primary Examiner* — George Bugg
*Assistant Examiner* — Sharmin Akhter
(74) *Attorney, Agent, or Firm* — Sughrue Mion, PLLC

(57) ABSTRACT

The present invention is a biometric authentication apparatus comprising, a fingertip sensor mounted on a tip placement surface of a tip placement section for placing a tip of a finger cushion said fingertip sensor detecting displacement of an arrangement position of a finger on the tip placement surface of the tip placement section, wherein the biometric authentication apparatus detects the displacement of a position of the tip of the finger cushion.

8 Claims, 6 Drawing Sheets

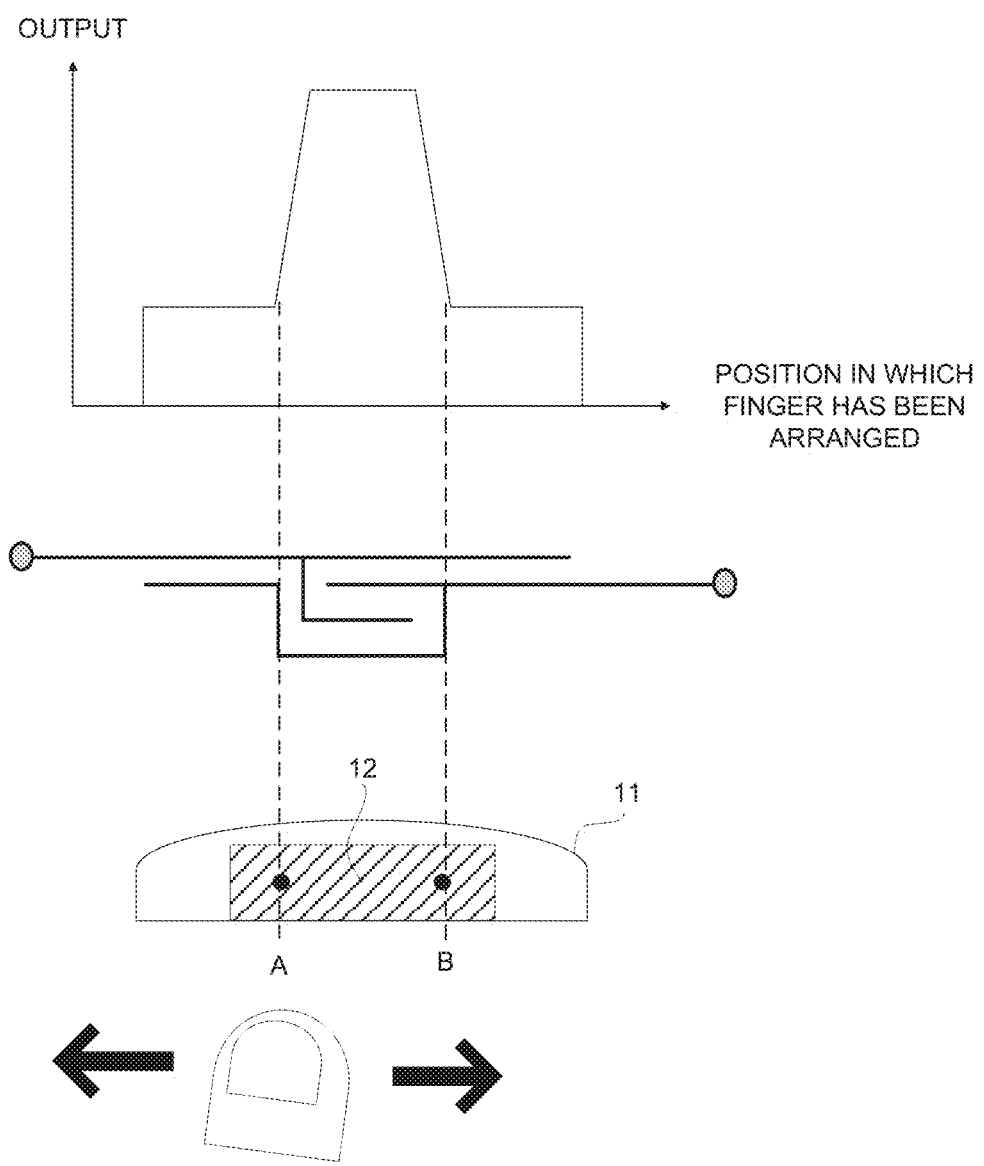

BIOMETRIC AUTHENTICATION APPARATUS AND BIOMETRIC AUTHENTICATION METHOD

This application is a National Stage Entry of PCT/JP2011/071362 filed Sep. 20, 2011, which claims priority from Japanese Patent Application 2010-216378 filed Sep. 28, 2010, the contents of all of which are incorporated herein by reference, in their entirety.

TECHNICAL FIELD

The present invention relates to a biometric authentication apparatus and a biometric authentication method.

BACKGROUND ART

The biometric authentication technology of authenticating a person using an image of a finger is known as a technique of collating a pattern of an epidermis such as a fingerprint of a finger, and a pattern of a blood vessel with previously registered information.

In the biometric authentication apparatus employing this technology, correct authentication cannot be obtained, the personal authentication is rejected as NG (No Good), and much time for the authentication is required unless the fingerprint etc., being a target of authentication, is imaged in a situation in which the fingerprint etc. is arranged at a correct position in the biometric authentication apparatus.

Thereupon, the individual authentication apparatus by a finger vein that aims for enabling a user to easily recognize a position for placing the finger is described in Patent literature 1.

The individual authentication apparatus described in the Patent literature 1 notifies a user of the position for placing the finger by lighting the position, and reduces displacement of the finger by making the user press a data loading switch while adjusting the finger to a light emission unit.

CITATION LIST

Patent Literature

PTL 1: JP-P2005-323892A

SUMMARY OF INVENTION

Technical Problem

However, the invention disclosed in the above-described Patent literature 1 has the following problems.

The invention of the Patent literature 1, which adjusts the finger to the light emission unit, has a problem that a utilizer cannot recognize the position of the finger even though the finger is placed in a situation of being rotated, and even though the finger is placed in a situation of being displaced to a left and a right.

Thereupon, the present invention has been accomplished in consideration of the above-mentioned problems, and an object of the present invention is to provide a biometric authentication apparatus and a biometric authentication method that detect position displacement of a target of the imaging that occurs in a case in which the utilizer places the finger in a situation of being rotated, and places the finger in a situation of being displaced to a left and a right.

Solution to Problem

The present invention is a biometric authentication apparatus comprising, a fingertip sensor mounted on a tip placement surface of a tip placement section for placing a tip of a finger cushion said fingertip sensor detecting displacement of an arrangement position of a finger on the tip placement surface of the tip placement section, wherein said biometric authentication apparatus detects the displacement of a position of the tip of the finger cushion.

The present invention is biometric authentication method comprising: detecting displacement of a position of a e tip of a finger cushion by a fingertip sensor that is mounted on a tip placement surface of a tip placement section for placing the tip of the finger cushion; and teaching a utilizer the displacement of the arrangement position of the finger.

The present invention is a program for causing a computer to execute: a detection process of receiving a signal coming from a fingertip sensor for detecting displacement of a an arrangement position of a finger, said fingertip sensor mounted in a tip placement surface of a tip placement section for placing a tip of a finger cushion, and detecting the displacement of a position of the tip of the finger cushion; and a teaching process of teaching a utilizer the displacement of the arrangement position of the finger.

Advantageous Effect of Invention

The present invention makes it possible to detect position displacement of a target of the imaging that occurs in a case in which the utilizer places the finger in a situation of being rotated, and places the finger in a situation of being displaced to a left and a right.

BRIEF DESCRIPTION OF DRAWINGS

FIG. 7 is a view for explaining a wiring pattern of a sensor 12 and an output thereof in the example 1.

DESCRIPTION OF EMBODIMENTS

First Exemplary Embodiment

The biometric authentication apparatus relating to the first exemplary embodiment, which is an apparatus that simultaneously images the fingerprint of the finger of the user and the vein existing inside it, can be utilized, for example, as the individual authentication apparatus (biometric authentication apparatus) that authenticates the person by utilizing the imaged fingerprint and vein of the finger. The finger to be imaged could be any finger (a thumb, an index finger, a middle finger, a ring finger, and a little finger); however, herein, the case of imaging the fingerprint and the vein of the index finger (hereinafter, simply, referred to as a "finger") is exemplified for explanation.

Figure 1:
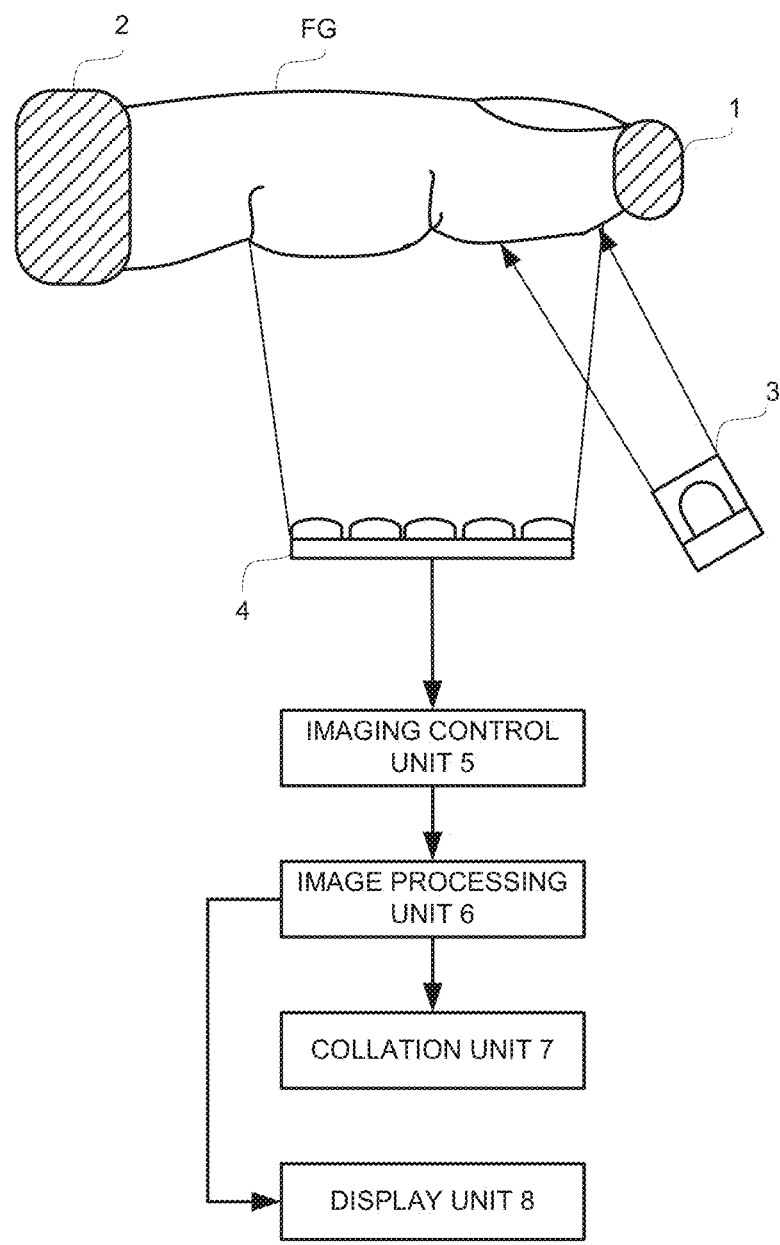
FIG. 1 is a block diagram of the individual authentication apparatus in a first exemplary embodiment.

FIG. 1 is a block diagram of the individual authentication apparatus in this exemplary embodiment. As shown in FIG. 1, the individual authentication apparatus in the first exemplary embodiment includes a tip placement section 1 for placing a tip of a finger cushion of a finger FG, a base placement section 2 for placing a base of the finger cushion of the finger FG, a spot light generation light source 3, an imaging unit 4, an imaging control unit 5, an image processing unit 6, a collation unit 7, and a display unit 8.

Figure 2:
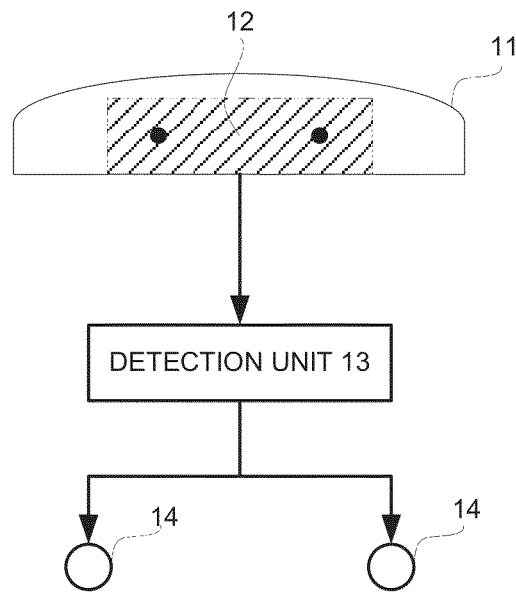
FIG. 2 is a view for explaining a sensor to be mounted in a tip placement section 1.

The tip placement section 1, as shown in FIG. 2, includes a tip placement surface 11 on which the tip of the finger cushion is placed, and a sensor 12 for detecting an arrangement position of the finger from an electric change.

The tip placement surface 11 is a surface that the tip of the finger cushion contacts, and has such a shape of a concave surface that gets itself to the tip of the finger cushion of the finger FG. The sensor 12, which is arranged inside the tip placement surface 11, detects rotation and position displacement in a left direction and a right direction (a direction vertical to a line connecting the tip placement section 1 and the base placement section 2) of the finger FG, being a target of the imaging. And, the sensor 12 supplies an output of the sensor 12 to a detection unit 13 mounted inside the individual authentication apparatus.

With regard to a method of detecting the position displacement of the finger by the detection unit 13, a wiring pattern, of which an output is changed responding to a position in which the finger contacts the tip placement surface 11, and a switch, which is switched on when the finger contacts the tip placement surface 11, can be employed as the sensor 12 to detect the position displacement from the above signal.

Figure 3:
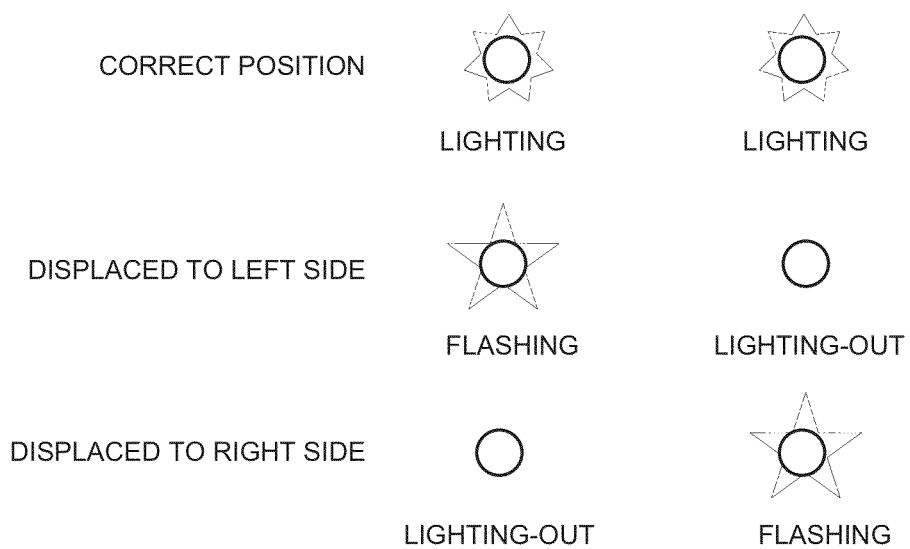
FIG. 3 is a view illustrating one example of guidance by a guidance lamp 14.

The guidance lamp 14 guides the position displacement of the finger based on a detection result of the detection unit 13. For example, based on the detection result of the detection unit 13, the guidance lamp 14 teaches the user the position of the tip placement surface 11 in which the finger is located, namely the position in which the fingertip should be arranged by lighting and flashing the lamp. FIG. 3 shows one example of the guidance by the guidance lamp 14. In FIG. 3, the guidance example by the two guidance lamp 14 is shown, and when the finger FG is correctly arranged on the tip placement surface 11, both of the two guidance lamps 14 are lighted. On the other hand, when the finger FG is arranged in the left side of the tip placement surface 11, namely is displaced to the left side from the correct position, only the left-side guidance lamp 14 is flashed, and when the finger FG is arranged in the right side of the tip placement surface 11, namely is displaced to the right side from the correct position, only the right-side guidance lamp 14 is flashed. In such a manner, the guidance lamp 14 guides the position in which the finger FG is arranged to the correct position.

The spot light generation light source 3, which is mounted at a position in which a contact with the finger FG is not made, radiates parallel light to a fingerprint portion in a spot manner at an almost uniform luminance in terms of an entirety of the fingerprint portion between a distal interphalangeal joint (first knuckle joint) of the finger FG and the fingertip. Herein, the so-called parallel light is light that is uniformly radiated at an almost identical angle to the fingerprint portion (the surface of the fingerprint portion). Further, the spot light generation light source 3 preferably radiates light from one direction because it is desired that shadow due to irregularities of the skin surface is generated as much as possible in order to image the fingerprint, being the irregularities of the skin surface of the finger FG.

Preferably, the spot light of the spot light generation light source 3 is light having a wavelength component of a wavelength ranging from 1000 nm to 600 nm or so that is known as light easily permeating a body tissue except for bones of human being, and the spot light generation light source is comprised of, for example, a halogen lamp, a xenon lamp and a lens, or LED etc. having an emission feature within the corresponding wave length to which a lens has been attached.

The imaging unit 4 is configured of an image sensor such as CCD and CMOS, a control system, a lens optical system for focusing a fingerprint image and a blood vessel image of the finger in the image sensor, and the like. Herein, the imaging unit 4 images the fingerprint of the fingerprint portion between the distal interphalangeal joint (first knuckle joint) of the finger FG and the fingertip with reflected light to the fingerprint portion between the distal interphalangeal joint (first knuckle joint) of the finger FG and the fingertip due to radiated light coming from the spot light generation light source 3 taken as main light, and images the blood vessel with scattered light that leaks (is radiated) from the epidermis between the distal interphalangeal joint (first knuckle joint) and a proximal interphalangeal joint (second knuckle joint) as a result of the fact that the light radiated to the fingerprint portion from the spot light generation light source 3 is scattered inside the finger FG and is propagated. Additionally, the fingerprint and the blood vessel are simultaneously imaged by the imaging unit 4. Additionally, the imaging unit 4 is mounted at a position in which a contact with the finger FG is not made, similarly to the spot light generation light source 3.

The imaging control unit 5 controls the imaging of the imaging unit 4, prepares the signal of the imaging unit 4 as data, and sends the fingerprint image and the blood vessel image to the image processing unit 6.

The image processing unit 6 extracts a center of the fingerprint from the image data of the fingerprint acquired from the imaging control unit 5 to measure the displacement of the center of the finger FG from an external shape. And, the image processing unit 6 detects a rotational quantity of the finger, displays correct position modification information of the finger on the display unit 8 by the above rotational quantity, and urges an authenticatee who receives the authentication to correctly modify the position of the finger. In addition, the image processing unit 6 extracts an image feature of the fingerprint and the finger blood vessel from the data of the image taken by the imaging unit 4 after correctly modifying the position of the finger FG, and outputs data of the extracted image feature to the collation unit 7.

The collation unit 7 in which the image feature of the fingerprint and the finger blood vessel of the authenticatee has been stored collates the stored image feature of the fingerprint and the finger blood vessel of the authenticatee with the image feature of the fingerprint and the finger blood vessel coming from the image processing unit 6, and performs the authentication.

Additionally, the image processing unit 6 or the collation unit 7 may record a plurality of pieces of reference data (the image feature of the fingerprint and the finger blood vessel) registered by previously rotating the finger of the authenticatee, select data having the rotational quantity of which the image feature approximates the image feature of the fingerprint and the finger blood vessel extracted by the image processing unit 6, and perform the collation with the image feature of the fingerprint and the finger blood vessel thereof.

Next, an operation of the imaging of the fingerprint and the blood vessel, and the collation in the first exemplary embodiment will be explained.

Figure 4:
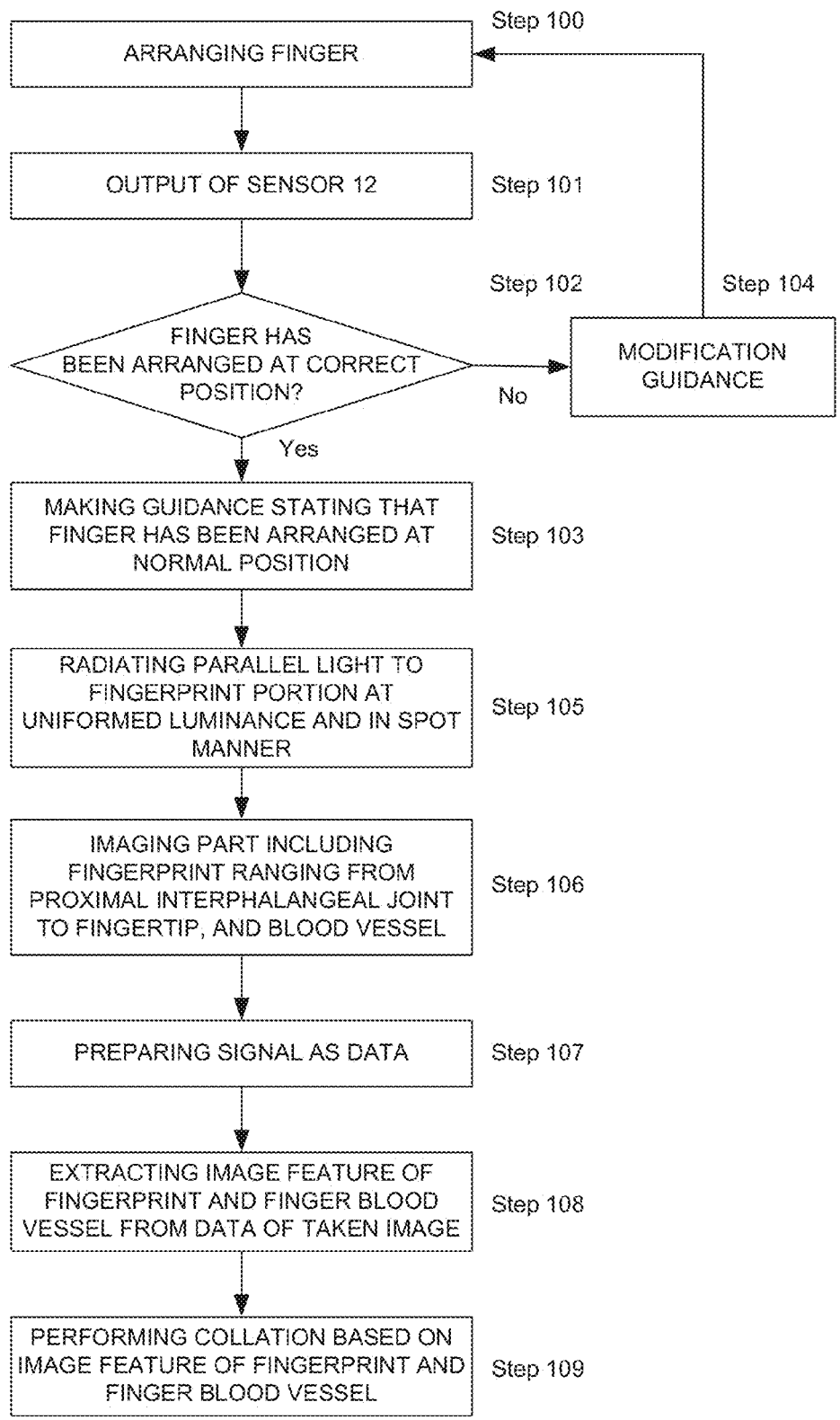
FIG. 4 is an operational flowchart of an operation in the first exemplary embodiment.

FIG. 4 is an operational flowchart of the imaging of the fingerprint and the blood vessel, and the collation in the first exemplary embodiment.

At first, the finger FG is arranged on the tip placement section 1 and the base placement section 2 (Step 100).

The sensor 12 performs the outputting responding to the position of the tip of the finger cushion of the arranged finger FG (Step 101).

The detection unit 13, upon receipt of the output of the sensor 12, detects where the finger is arranged in terms of the position of the tip placement surface 11. The detection unit 13 teaches that the finger FG has been correctly arranged (Step 103) by lighting both of the two guidance lamps 14 when the detected position is a correct arrangement position (Step 102).

On the other hand, the detection unit 13 teaches that the finger FG has been displaced to the side in which the guidance lamp 14 flashes by flashing the guidance lamp 14 existing in the displacement direction with the correct arrangement position at a center, out of the two guidance lamps 14, (Step 104) when the detected position is not a correct arrangement position (Step 102).

When it is detected that the finger FG has been correctly arranged, the spot light generation light source 3 radiates the parallel light to an entirety of the fingerprint portion above the distal interphalangeal joint (first knuckle joint) of the finger FG at a uniform luminance and in a spot manner (Step 105).

The imaging unit 4 images, by the imaging control unit 5, the part that includes the fingerprint ranging from the proximal interphalangeal joint (second knuckle joint) to the fingertip and the blood vessel of the finger FG (Step 106). Herein, the fingerprint portion between the distal interphalangeal joint (first knuckle joint) of the finger FG and the fingertip is imaged with the reflected light due to the radiated light taken as main light. On the other hand, comparatively large blood vessels exist between the distal interphalangeal joint (first knuckle joint) and the proximal interphalangeal joint (second knuckle joint) of the finger FG and just under the skin in the neighborhood of the knuckle joints. In this portion, light radiated to the fingerprint portion by the spot light generation light source 3 is scattered within the finger, is propagated within the finger, and is radiated from the epidermis, and thus the blood vessel is imaged. Additionally, the fingerprint and the blood vessel are simultaneously imaged.

The imaging control unit 5 prepares the signal of the imaging unit 4 as data, and outputs the fingerprint image and the blood vessel image to the image processing unit 6 (Step 107).

The image processing unit 6 extracts the image feature of the fingerprint and the finger blood vessel from the data of the image taken by the imaging unit 4, and outputs data of the extracted image feature to the collation unit 7 (Step 108).

The collation unit 7 performs the collation based on the image feature of the fingerprint and the finger blood vessel coming from the image processing unit 6 (Step 109).

As explained above, the first exemplary embodiment exhibits an effect described below.

The first exemplary embodiment makes it possible to detect the position displacement of the finger that exerts an influence on the image of the authentication part of the finger, in particular, the rotation of the finger caused by the position displacement of the fingertip, and the position displacement in the left direction and the right direction, and to take the correct image necessary for the authentication.

In addition, the first exemplary embodiment radiates the parallel light to the fingerprint portion of the finger in a spot manner, simultaneously takes the blood vessel images by the scattered light that is scattered inside the finger, is propagated from the fingerprint portion, and leaks out (is radiated) from the epidermis between the distal interphalangeal joint (first knuckle joint) and the proximal interphalangeal joint (second knuckle joint), and the fingerprint image by the parallel light radiated to the fingerprint portion of the finger in a spot manner with one imaging unit, whereby an effect lies in a point of being able to perform the collation process (individual authentication) for a short time with a simplified structure.

Further, the parallel light to be radiated to the fingerprint portion in a spot manner allows the shadow to be easily generated due to the irregularities of the fingerprint, and the scattered light allows the fingerprint image having an excellent contrast to be obtained.

Second Exemplary Embodiment

The second exemplary embodiment will be explained.

The second exemplary embodiment is provided with a sensor for detecting that the base of the finger has been arranged on the base placement section 2 for placing the base of the finger cushion in addition to the first exemplary embodiment, and an example will be explained of starting the imaging when the base of the finger has been arranged on the base placement section 2 and yet the tip of the finger has been correctly arranged.

Figure 5:
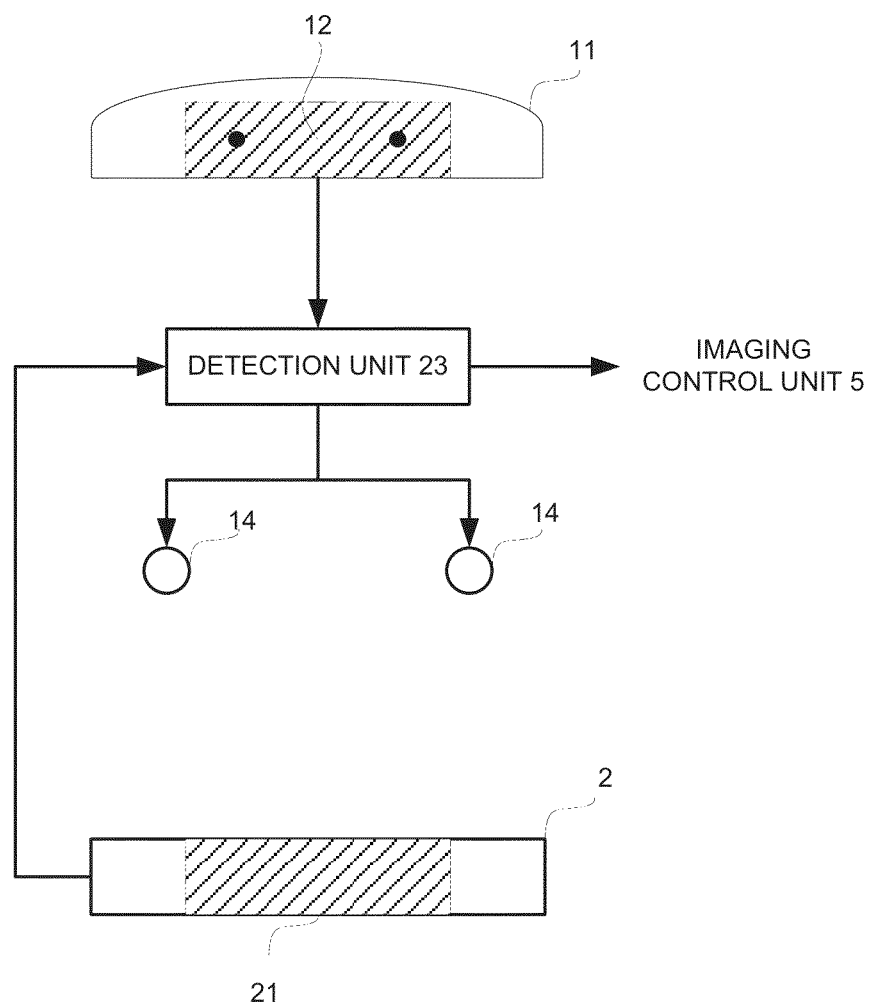
FIG. 5 is a block diagram of a second exemplary embodiment.

FIG. 5 is a block diagram of the second exemplary embodiment. Additionally, identical codes are affixed to the parts similar to the first exemplary embodiment, so the detailed explanation is omitted.

As shown in FIG. 5, the base placement section 2 is provided with a sensor 21. The sensor 21 is a pressure sensor of which a switch is switched on when the base of the finger contacts the base placement section 2.

A detection unit 23 inputs an output of the sensor 12 and an output of the sensor 21. And, the detection unit 23 instructs the imaging control unit 5 to start the imaging when the sensor 12 detects that the tip of the finger FG has been correctly arranged and the base of the finger FG has been arranged on the base placement section 2.

In accordance with the second exemplary embodiment, there is no possibility that the imaging is performed in a situation in which only tip of the finger has been arranged on the tip placement section 1 because it is detected that the base of the finger has been arranged on the base placement section 2, whereby a failure of the imaging of the fingerprint and the blood vessel of the finger necessary for the authentication can be prevented, in addition to the effect of the first exemplary embodiment.

Example 1

Next, a specific example 1 of the present invention will be explained.

Figure 6:
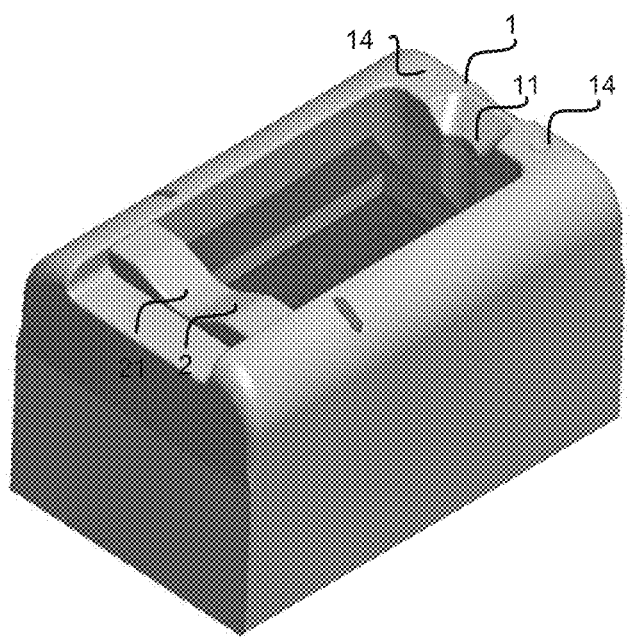
FIG. 6 is an appearance view of the individual authentication apparatus of an example 1.

FIG. 6 is an appearance view of the individual authentication apparatus of the example 1.

As shown in FIG. 6, the individual authentication apparatus of the example 1 includes a tip placement section 1 for placing the tip of the finger cushion of the finger FG and a base placement section 2 for placing the base of the finger cushion of the finger FG, and includes a sensor 12 for detecting the arrangement position of the finger from an electric change insides a tip placement surface 11 of the tip placement section 1. Further, the individual authentication apparatus includes a sensor 21, being a pressure sensor, insides the base placement section 2.

One example of the sensor 12 to be mounted insides the tip placement surface 11 is shown in FIG. 7.

The sensor 12 is a sensor having a wiring pattern as shown in FIG. 7 in which the flowing current is changed responding to the position of the finger that contacts the sensor 12 and an output thereof is also changed. With the wiring pattern show in FIG. 7, a value of an output to the detection unit 23 becomes maximized when the finger is arranged between a position A and a position B, and an output of the sensor becomes one third of the maximum value when the finger is arranged in the neighborhood of the position A and when the finger is arranged in the neighborhood of the position B.

The detection unit 23, upon receipt of such an output of the sensor 12, detects the position in which the finger has been arranged, and lights or flashes the guidance lamp 14. For example, the detection unit 23 lights both of the two guidance lamps 14 when the finger has been correctly arranged on the tip placement surface 11. On the other hand, the detection unit 23 flashes only the left-side guidance lamp 14 when the finger has been arranged in the left side of the tip placement surface 11, namely the finger has been displaced to the left side from the correct position, and the detection unit 23 flashes only the right-side guidance lamp 14 when the finger has been arranged in the right side of the tip placement surface 11, namely the finger has been displaced to the right side from the correct position. In such a manner, the detection unit 23 guides the position in which the finger is arranged to the correct position.

On the other hand, when the base of the finger is arranged in a situation of having a contact with the base placement section 2, the contact of the base of the finger with the base placement section 2 is detected by the pressure sensor of the sensor 21 mounted on the base placement section 2, and this detection result is outputted to the detection unit 23.

The detection unit 23 instructs the imaging control unit 5 to start the imaging when an output of the sensor 12 and an output of the sensor 21 are inputted, an output of the sensor 12 indicates that the tip of the finger has been arranged at a correct position and yet the contact of the base of the finger with the base placement section 2 has been detected due to an output of the sensor 21.

Additionally, as apparent from the above-described explanation, each unit can be configured with hardware; however, it can be also realized with a computer program. In this case, functions and operations similar to those of the above-described embodiments and example are realized with a processor that operates under a program stored in a program memory.

Further, the content of the above-mentioned exemplary embodiments can be expressed as follows.

(Supplementary note 1) A biometric authentication apparatus comprising,
a fingertip sensor mounted on a tip placement surface of a tip placement section for placing a tip of a finger cushion said fingertip sensor detecting displacement of an arrangement position of a finger on the tip placement surface of the tip placement section,
wherein said biometric authentication apparatus detects the displacement of a position of the tip of the finger cushion.

(Supplementary note 2) The biometric authentication apparatus according to Supplementary note 1, comprising a guidance means that teaches the displacement of the arrangement position of the finger based on a detection result of said fingertip sensor.

(Supplementary note 3) The biometric authentication apparatus according to Supplementary note 1 or Supplementary note 2, wherein said fingertip sensor is a sensor of which an output is changed responding to the arrangement position of the finger.

(Supplementary note 4) The biometric authentication apparatus according to one of Supplementary note 1 to Supplementary note 3, comprising a finger base sensor mounted on a base placement section for placing a base of a finger cushion said finger base sensor detecting that a base of the finger has been arranged on said base placement section,
wherein said biometric authentication apparatus starts imaging of a portion, being a target of authentication, when it is detected by said finger base sensor that the base of the finger has been arranged on said base placement section and yet the tip of the finger has been correctly arranged by said fingertip sensor.

(Supplementary note 5) A biometric authentication method comprising:
detecting displacement of a position of a e tip of a finger cushion by a fingertip sensor that is mounted on a tip placement surface of a tip placement section for placing the tip of the finger cushion; and
teaching a utilizer the displacement of the arrangement position of the finger.

(Supplementary note 6) The biometric authentication method according to Supplementary note 5, wherein said fingertip sensor detects the arrangement position of the finger from a change in an electric output.

(Supplementary note 7) The biometric authentication method according to Supplementary note 5 or Supplementary note 6, comprising:
starting imaging of a portion, being a target of authentication, when it is detected by a finger base sensor that a base of the finger has been arranged on a base placement section for placing the base of the finger cushion and yet the tip of the finger has been correctly arranged by said fingertip sensor, said finger base sensor mounted on said base placement section.

(Supplementary note 8) A program for causing a computer to execute:
a detection process of receiving a signal coming from a fingertip sensor for detecting displacement of a an arrangement position of a finger, said fingertip sensor mounted in a tip placement surface of a tip placement section for placing a tip of a finger cushion, and detecting the displacement of a position of the tip of the finger cushion; and
a teaching process of teaching a utilizer the displacement of the arrangement position of the finger.

(Supplementary note 9) The program according to Supplementary note 8, wherein said detection process is a process of detecting the arrangement position of the finger from a change in an electric output of said fingertip sensor.

(Supplementary note 10) The program according to Supplementary note 8 or Supplementary note 9, causing the computer to executed an imaging process of imaging a portion, being a target of authentication, when from a signal coming from a finger base sensor for detecting that a base of finger has been arranged, said finger base sensor mounted in a base placement section for placing the base of the finger cushion, it is detected by said finger base sensor the base of the finger has been arranged on said base placement section and yet the tip of the finger has been correctly arranged by said fingertip sensor.

Above, although the present invention has been particularly described with reference to the preferred embodiments and the examples, it should be readily apparent to those of ordinary skill in the art that the present invention is not always limited to the above-mentioned embodiments and the examples, and changes and modifications in the form and details may be made without departing from the spirit and scope of the invention.

This application is based upon and Supplementary notes the benefit of priority from Japanese patent application No.

2010-216378, filed on Sep. 28, 2010, the disclosure of which is incorporated herein in its entirety by reference.

REFERENCE SIGNS LIST 1 tip placement section
2 base placement section
3 spot light generation light source
4 imaging unit
5 imaging control unit
6 image processing unit
7 collation unit
8 display unit
11 tip placement surface
12 and 21 sensors
13 and 23 detection units
14 guidance lamp

The invention claimed is:

1. A biometric authentication apparatus comprising:
a fingertip sensor mounted on a tip placement surface of a tip placement section for placing a tip of a finger, said fingertip sensor detecting displacement of an arrangement position of the finger on the tip placement surface of the tip placement section;
detector that detects the displacement of the arrangement position of the tip of the finger;
a finger base sensor mounted on a base placement section for placing a base of the finger, said finger base sensor detecting that the base of the finger has been arranged on said base placement section, and
imaging controller that starts imaging of a portion, being a target of authentication, when it is detected by said finger base sensor that the base of the finger has been arranged on said base placement section and yet the tip of the finger has been correctly arranged by said fingertip sensor.

2. The biometric authentication apparatus according to claim 1, further comprising a guidance means that teaches the displacement of the arrangement position of the finger based on a detection result of said fingertip sensor.

3. The biometric authentication apparatus according to claim 1, wherein said fingertip sensor is a sensor of which an output is changed responding to the arrangement position of the finger.

4. A biometric authentication method comprising:
detecting displacement of an arrangement position of a tip of a finger by a fingertip sensor that is mounted on a tip placement surface of a tip placement section for placing the tip of the finger;
teaching a utilizer the displacement of the arrangement position of the finger;
starting imaging of a portion, being a target of authentication, when it is detected by a finger base sensor that a base of the finger has been arranged on a base placement section for placing the base of the finger and yet the tip of the finger has been correctly arranged by said fingertip sensor, said finger base sensor mounted on said base placement section.

5. The biometric authentication method according to claim 4, wherein said fingertip sensor detects the arrangement position of the finger from a change in an electric output.

6. A non-transitory computer readable storage medium storing a program for causing a computer to execute:
a detection process of receiving a signal coming from a fingertip sensor for detecting displacement of an arrangement position of a finger, said fingertip sensor mounted in a tip placement surface of a tip placement section for placing a tip of the finger, and detecting the displacement of the arrangement position of the tip of the finger;
a teaching process of teaching a utilizer the displacement of the arrangement position of the finger;
an imaging process of imaging a portion, being a target of authentication, when from a signal coming from a finger base sensor for detecting that a base of finger has been arranged, said finger base sensor mounted in a base placement section for placing the base of the finger, it is detected by said finger base sensor the base of the finger has been arranged on said base placement section and yet the tip of the finger has been correctly arranged by said fingertip sensor.

7. The non-transitory computer readable storage medium storing a program according to claim 6, wherein said detection process is a process of detecting the arrangement position of the finger from a change in an electric output of said fingertip sensor.

8. The biometric authentication apparatus according to claim 2, wherein said fingertip sensor is a sensor of which an output is changed responding to the arrangement position of the finger.

* * * * *